United States Patent [19]

Upton et al.

[11] Patent Number: 4,580,800
[45] Date of Patent: Apr. 8, 1986

[54] SHOPPING CART SECURITY DEVICE

[75] Inventors: Gene Upton, Mission Viejo; Horst B. Krippner, Vista, both of Calif.

[73] Assignee: Kart Guard Internationale, Inc., San Diego, Calif.

[21] Appl. No.: 610,976

[22] Filed: May 16, 1984

[51] Int. Cl.$^4$ ............................................. B60B 33/02
[52] U.S. Cl. .............................. 280/33.99 C; 16/35 R
[58] Field of Search ............... 280/33.99 C, 43, 43.24; 16/35 R, 35 D

[56] References Cited

U.S. PATENT DOCUMENTS 3,090,470  5/1963  Abrams ...................... 280/33.99 C
3,608,693  9/1971  Stosberg et al. ............ 280/33.99 C

FOREIGN PATENT DOCUMENTS 1224968  3/1971  United Kingdom ......... 280/33.99 C

*Primary Examiner*—David M. Mitchell
*Assistant Examiner*—Richard M. Camby
*Attorney, Agent, or Firm*—Brown, Martin & Haller

[57] ABSTRACT

A security device for use on shopping carts comprises an extra wheel adapted to be installed on a cart such that it normally travels along the ground at location spaced behind the front wheels, and a locking assembly for locking the extra wheel in a turn-inducing orientation when actuated by someone pushing the cart over a raised barrier. The extra wheel is mounted on the cart by a telescopic mounting assembly comprising first and second telescoping cylinders. The first cylinder is adapted to be mounted on the cart in a vertical orientation at a position spaced behind the front wheels, and the extra wheel is mounted at the lower end of the second cylinder which is telescopically engaged in the first cylinder. Swivelling motion of the extra wheel is allowed by rotation of the second cylinder, and the locking assembly is arranged to lock the second cylinder against rotation as soon as the operator attempts to make a turn after it has been actuated by the second cylinder sliding out of the first cylinder as a result of the front end of the cart passing over the barrier.

10 Claims, 4 Drawing Figures

U.S. Patent     Apr. 8, 1986     4,580,800
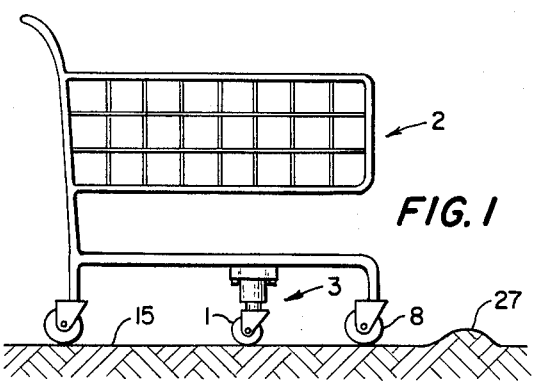
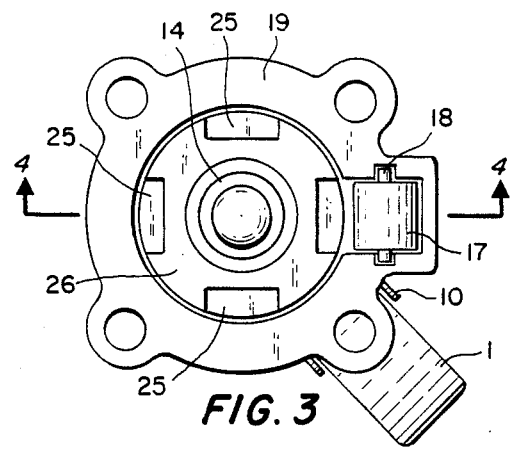
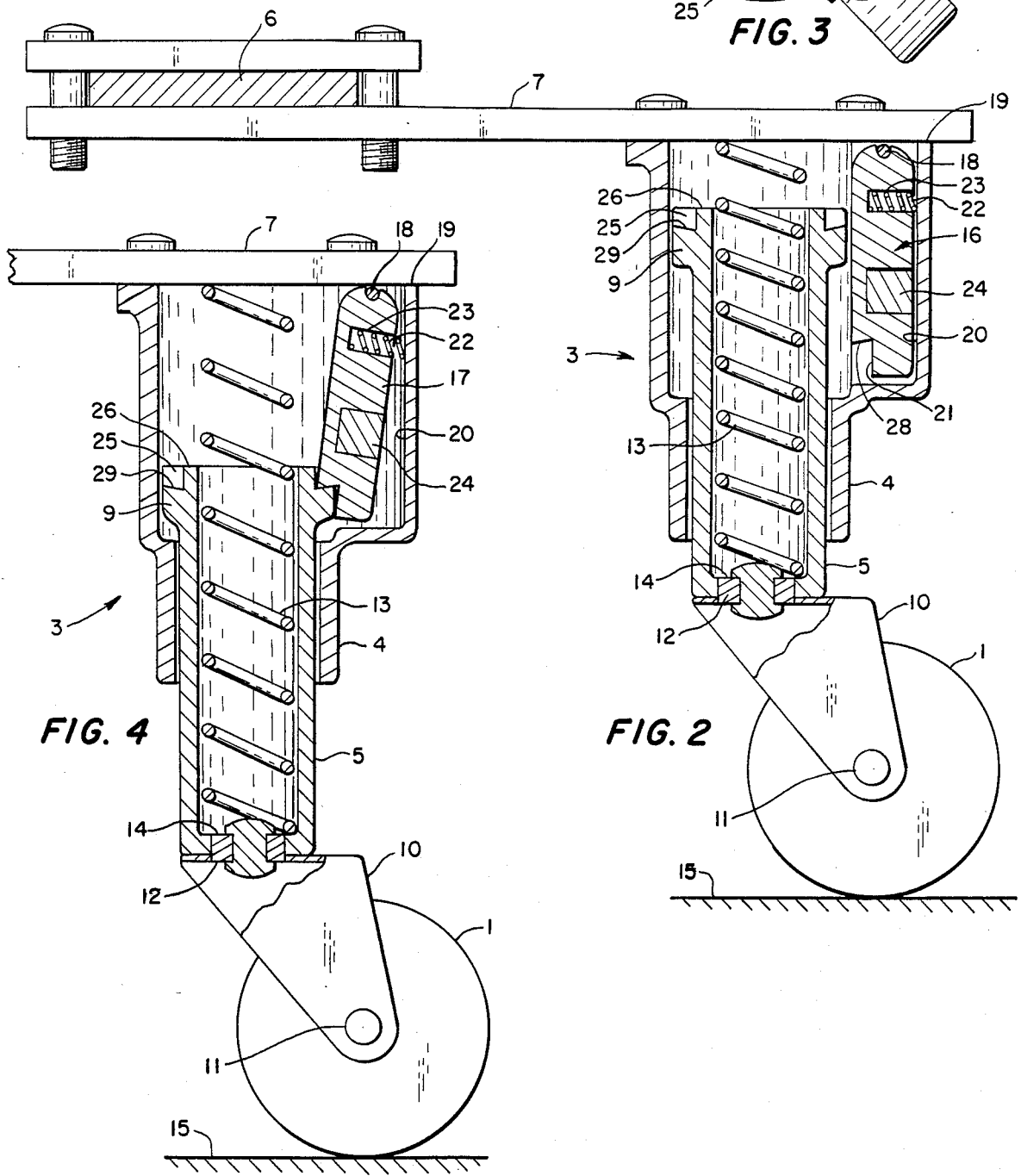

SHOPPING CART SECURITY DEVICE

BACKGROUND OF THE INVENTION

The present invention relates to a security device for restricting or discouraging the unauthorized removal of shopping carts and other similar swivel wheeled carts from designated areas.

At the present time, there are many thousands of markets and stores which utilize a significant number of shopping carts in or on their premises. Customers are generally allowed to take shopping carts from the store to their cars in the parking lot. Unfortunately, a significant number of shopping carts are removed or stolen from store parking lots. Customers without cars sometimes use the carts to transport their groceries home, and then either abandon them or keep them for future use. The loss rate from such unauthorized uses and thefts is alarmingly high and is extremely expensive for the store owners who must replace lost carts. It is estimated that more than a million shopping carts are stolen annually from markets and stores in the United States alone. These thefts result in significant annual losses for store owners.

Shopping cart anti-theft or security devices proposed in the past have mainly comprised some form of wheel locking or braking system. U.S. Pat. No. 3,031,037 to Stollman shows a device for locking the wheel of a shopping cart against rotation when the cart passes over a magnetic barrier. All of the devices of this type generally require some modification of the shopping cart wheel itself, which is relatively expensive and awkward. Also, the known devices are often relatively open to tampering to release the lock.

SUMMARY OF THE INVENTION

It is an object of the present invention to provide a shopping cart security device which does not require modification of any of the existing wheels of the cart and which can therefore be easily installed on existing shopping carts.

The security device of the present invention comprises an extra wheel adapted to be mounted on shopping cart such that it normally travels along the ground with the other wheels but in a position spaced behind the front wheels. In the preferred embodiment the extra wheel trails behind the front wheels. The extra wheel is mounted so as to be vertically slidable relative to the cart, so that when the front end of the cart is raised, for example when the front wheels are pushed over a raised barrier or when the cart is lifted, the extra wheel slides downwardly to stay in contact with the ground. The extra wheel is associated with a locking assembly which is actuated by the wheel moving downwardly relative to the cart, and which is arranged to lock the extra wheel against swivelling motion. Preferably, the locking assembly is arranged to lock the extra wheel in a turn-inducing orientation when actuated, once a person pushing the cart attempts to make a turn. The locking assembly preferably comprises some form of latching mechanism for latching the extra wheel against swivelling rotation.

The security device of this invention is designed to be used in conjunction with a raised barrier which extends around the perimeter of a store parking lot, for example. When a person pushing the cart attempts to leave the parking lot, the front wheels passing over the barrier will raise the front of the cart, so that the extra wheel drops down and the locking assembly is actuated. When the person attempts to make a turn, the extra wheel is locked in a turn inducing orientation, which tends to make the cart turn in a circle. This will make the cart difficult to control and will discourage many casual thefts.

The extra wheel is preferably mounted on the cart by means of a telescopic mounting assembly comprising a first member adapted to be rigidly mounted on the cart and a second member mounted so as to be freely vertically slidable relative to the first member, the extra wheel being mounted at the lower end of the second member so as to be rotatable in the direction of travel of the cart and the second member being rotatable relative to the first member so as to allow the extra wheel to swivel to follow turning movement of the cart. The locking assembly is arranged to lock the second member against rotation such that the extra wheel is locked in a turn-inducing orientation, the locking assembly being arranged to be actuated in response to vertical sliding movement between the first and second members as a result of the front wheels of the cart moving vertically relative to the extra wheel.

Preferably, the mounting assembly comprises first and second telescopic cylinders, and the locking assembly comprises a latch member mounted on the outer cylinder and indent means at a predetermined position on the inner cylinder, such that when the cylinders slide relative to one another so that the latch member is aligned with the indent means, the locking assembly is actuated. The indent means may include a series of indents located around the inner cylinder corresponding to turn-inducing orientations of the extra wheel, and the latch member is arranged to engage one of the indents when the extra wheel is swivelled with the locking assembly actuated, so as to lock the extra wheel in a turn-inducing orientation. Preferably, the indents are provided in the upper face of the inner cylinder and the latch member engages over this face when actuated. The inner cylinder is thus prevented from sliding back up into the outer cylinder and the extra wheel will no longer be level with the other wheels of the cart when the cart is again on level ground. Thus the cart will be operable on the extended extra wheel and the rear wheels.

In this position, when an attempt is made to make a turn with the cart, the extra wheel turns until the latch member is aligned with one of the indents. The latch member then engages in the aligned indent to lock the inner cylinder and the extra wheel against any further rotation. It will then be extremely difficult to push the cart since it will tend to rotate in a circle.

A release mechanism is preferably provided to release the locking assembly once a cart has been returned to the designated area. For example, the latch member may have a magnetically susceptible portion arranged such that when someone passes a magnet adjacent to the outer cylinder when the front of the cart is lifted and pressure against the latch is released, the latch member is urged back into a released position and the inner cylinder is again freely slidable and rotatable.

The present invention provides a shopping cart security device which discourages theft of shopping carts and which is relatively easy to manufacture and install. It can be easily mounted on existing carts and requires no special adaptation of any part of the cart. In practice the extra wheel mounting assembly can be for example, bolted to the forward end of the cart but behind the front wheels.

It is an object of the present invention to provide a security device which can be mounted directly on a shopping cart and which includes a locking assembly which, when actuated, tends to urge the cart to travel in a circle once the operator attempts to make a turn, thus discouraging unauthorized removal of shopping carts from shopping areas.

It is a further object of this invention to provide such a security device which will not normally interfere with the normal operation of the shopping cart.

BRIEF DESCRIPTION OF THE DRAWINGS

FIG. 1 shows a sketch side view of a shopping cart with a security device according to a preferred embodiment of the present invention mounted on the cart;

FIG. 2 shows a vertical cross section through the security device;

FIG. 3 shows a top plan view of the device with the locking assembly actuated; and FIG. 4 shows a vertical cross section on the line 4—4 of FIG. 3.

DESCRIPTION OF THE PREFERRED EMBODIMENT

FIGS. 1 to 4 show a preferred embodiment of the shopping cart security device according to the present invention. The device basically comprises an extra wheel 1 adapted to be mounted on a standard shopping cart 2 by means of a telescopic mounting assembly 3.

As shown in FIGS. 1 and 2, the mounting assembly 3 comprises first and second telescopically engaged cylinders 4 and 5. The first cylinder 4 is rigidly mounted on a structural front cross bar 6 of the cart 2 by means of a mounting plate 7 to which both the cross bar 6 and the cylinder 4 are bolted. The mounting arrangement is such that the extra wheel 1 trails behind the front wheels 8 of the cart and is located intermediate the two wheels when the cart is viewed from the front. The mounting assembly may alternatively be secured to the cart front cross bar by clamping, welding, or other convenient means.

The second cylinder 5 is slidably mounted in the first cylinder 4 and is normally free to rotate in that cylinder. The first cylinder 4 is of stepped diameter and the second cylinder 5 has a head portion 9 of increased diameter which prevents the cylinder 5 from sliding completely out of the cylinder 4. The extra wheel 1 is rotatably mounted in a frame member 10 via axle 11, and frame member 10 is bolted to the lower end 12 of the second cylinder 5. A spring 13 acts between the mounting plate 7 and the inner end 14 of the cylinder 5. Thus the cylinder 5 and wheel 1 are normally urged into the position shown where the wheel 1 engages the ground 15 and follows the travel of front wheels 8 of the cart. Rotation of the cylinder 5 in cylinder 4 allows the wheel 1 to swivel to follow turning movement of the cart.

A locking assembly 16 is provided which, when actuated, will eventually lock the wheel 1 in a turn inducing orientation, as described in more detail below. The assembly 16 comprises a latch member 17 pivotally mounted at 18 in an upper face 19 of the first cylinder 4 and normally located in a recessed area 20 provided in that cylinder. The latch member 17 is a generally cylindrical member with a stepped indent 21 at its lower edge. A spring 22 located in a transverse bore 23 in the latch member acts between the inner end of its bore and the opposite side wall of the cylinder 4 so as to urge the latch member away from the cylinder wall. The latch member 17 has an insert 24 of magnetically susceptible material at a location facing the wall of cylinder 4.

The locking assembly further comprises a series of spaced indents 25 located around the upper face 26 of the head portion 9, as shown in FIG. 3. The indents preferably comprise four symmetrically positioned indents which are orientated at 45 degrees to the mounting of the wheel 1 (indicated in dotted outline in FIG. 3).

During normal use of the cart 2 in an authorized shopping area, such as a store parking lot, the extra wheel 1 and mounting assembly 3 will be positioned as shown in FIGS. 1 and 2, on a level with the other wheels of the cart. When the cart is turned, cylinder 5 will rotate to allow the wheel 1 to swivel in the direction the cart is turned.

The security device of this invention is designed to be used in conjunction with a raised barrier 27 (shown in FIG. 1) which extends around the perimeter of a store parking lot, for example, or another area in which carts are to be used. If a person attempts to remove the cart from the authorized area by pushing it over the barrier 27, the front wheels 8 will first engage the barrier and lift the front end of the cart. The first cylinder 4 of the mounting assembly 3 will be raised with the cart, sliding upwardly relative to the second cylinder 5 and 1. When the upper face of cylinder 5 is aligned with the indent 21 on latch member 17, the latch member will be urged away from the wall of recess 20 under the action of the spring 22 so that the upper face 28 of indent 21, which is preferably inclined downwardly as shown, engages over the upper face of the cylinder 5. Thus the cylinder 5 is locked into a lower position in the cylinder 4.

When the cart has passed over the barrier 27, the extra wheel will no longer be level with the other wheels since the cylinder 5 will project further out of the cylinder 4 and thus the mounting assembly will increase in length. The front and rear wheels will be raised relative to the extra wheel, so it will be necessary for the person pushing the cart to tilt the cart forwards or backwards to allow the front or rear wheels to touch the ground. In addition to this problem, once an attempt is made to turn the cart, the wheel and cylinder 5 will rotate until the indent 21 of latching member 17 is aligned with one or other of the indents 25, and the latch member 17 will then engage in the aligned indent to prevent any further swivelling rotation of the wheel 1 and cylinder 5, as shown in FIG. 4. Since the lower faces 29 of the indents 25 are inclined upwardly at an angle corresponding to the downward inclination of the upper face 28 of indent 21 (as shown in FIG. 4), the latch member 17 will be held in this position against any vibration or shaking of the cart in an attempt to dislodge it.

At this point extra wheel 1 is locked in a turn inducing orientation and any attempt to push the tilted cart in a straight line will tend to cause it to rotate in a circle. Thus the cart must both be tilted and pushed against the braking action of the extra wheel 1 if it is to be removed from the shopping area, which will have an extremely discouraging effect on people attempting to remove the cart. It should be noted that the locking assembly will also be actuated if someone attempts to lift the cart over the barrier 27.

To release the locking assembly when a removed cart is returned to the shopping area, a shop assistant simply lifts the front of the cart releasing pressure against the latch member, and places a release magnet against the outer face of recess 20. The magnet attracts the portion 24 of the latch member 17 to urge it back into the released position shown in FIG. 2.

The security device described above can be easily mounted on existing shopping carts without any special adjustment to the carts being necessary. It is relatively inexpensive, particularly when the potential savings on lost carts are considered, and it is simple to install. The device will not interfere with normal use of the cart.

It will be clear that modifications can be made to the disclosed embodiment without departing from the scope of the invention. The invention is therefore not limited to the disclosed embodiment but is defined by the appended claims.

What is claimed is:

1. A shopping cart security device for discouraging the unauthorized removal of shopping carts from a predetermined area surrounded by a raised barrier, comprising:

security means for restricting free travel of a shopping cart after the shopping cart has been raised or pushed over a raised barrier, the security means comprising an extra wheel adapted to be installed on a shopping cart such that it normally travels along the ground with the other wheels of the cart but at a location spaced from the front wheels of the cart;

mounting means for mounting said extra wheel on said cart such that it is vertically slidable relative to the cart;

said mounting means including means for allowing swivelling motion of said wheel; and locking means for locking said extra wheel against swivelling motion in response to said extra wheel moving downwardly relative to said cart.

2. A shopping cart security device comprising:

an extra wheel adapted to be installed on a shopping cart such that it normally travels along the ground with the other wheels of the cart but at a location spaced from the front wheels of the cart;

mounting means for mounting said extra wheel on said cart such that it is vertically slidable relative to the cart;

said mounting means comprising a telescopic mounting assembly comprising a first member adapted to be rigidly mounted on said cart at a position spaced behind said front wheels, and a second member mounted so as to be vertically slidable relative to said first member, means for mounting the extra wheel at the lower end of said second member so that it is rotatable in the direction of travel of said cart, said second member being rotatable relative to said first member to allow swivelling motion of said extra wheel to follow turning movement of said cart; and locking means for locking said second member against rotation and actuating means for actuating said locking assembly in response to vertical sliding movement between said members.

3. The device of claim 2, wherein said actuating means operates to urge said locking assembly to lock said second member against rotation as a result of a turning movement of said cart, and the locking assembly comprises means for locking said extra wheel in a turn-inducing orientation relative to said cart.

4. The device of claim 2, wherein said mounting means comprises a first cylinder adapted to be rigidly mounted on said cart and a second cylinder telescopically engaged in said first cylinder, and said locking assembly comprises latch means mounted on one of said cylinders and indent means mounted on the other cylinder, the latch and indent means being positioned such that they are aligned when said second cylinder has slid a predetermined distance out of said first cylinder, said actuating means operating to hold said latch and indent means in said aligned position and to urge them into locking engagement in response to swivelling motion of said extra wheel.

5. The device of claim 4, wherein said indent means comprises a plurality of spaced indents provided around the upper face of said second cylinder, and said actuating means comprises means for urging said latch means to engage over said upper face when said second cylinder has moved said predetermined distance, and for urging said latch member to engage in an aligned one of said indents in response to rotation of said second cylinder as a result of swivelling motion of said extra wheel, such that said extra wheel is locked in a turn-inducing orientation.

6. The device of claim 5, wherein said indents are arranged at an angle of 45 degrees to the orientation at which said extra wheel is mounted on said second cylinder.

7. The device of claim 5, wherein said latch means has a downwardly inclined face and said indents have upwardly inclined faces which are adapted to engage with said downwardly inclined face when said latch means is engaged in one of said indents.

8. The device of claim 4, wherein resilient means are provided for urging said second cylinder in a direction away from said first cylinder.

9. The device of claim 4, wherein said actuating means comprise resilient means for urging said latch means to engage said indent means.

10. The device of claim 4, further including release means for releasing said latch means from said indent means.

* * * * *